United States Patent [19]

Jasny

[11] 4,026,650
[45] May 31, 1977

[54] DEVICE TO CORRECT COLOR

[75] Inventor: Jan Jasny, Warsaw, Poland

[73] Assignee: Centralne Laboratorium Optyki, Warsaw, Poland

[22] Filed: Dec. 12, 1974

[21] Appl. No.: 532,029

[30] Foreign Application Priority Data

Dec. 17, 1973 Poland .............................. 167384

[52] U.S. Cl. .................................. 355/36; 355/71
[51] Int. Cl.$^2$ ......................................... G03B 27/76
[58] Field of Search ................ 355/32, 35, 36, 83, 355/71, 88; 240/1 LP

[56] References Cited

UNITED STATES PATENTS

| | | | |
|---|---|---|---|
| 3,107,578 | 10/1963 | Engelage | 355/36 |
| 3,267,808 | 8/1966 | Czekalla et al. | 355/71 X |
| 3,482,914 | 12/1969 | Misener | 355/36 |
| 3,514,200 | 5/1970 | Bowker | 240/1 LP X |
| 3,596,083 | 7/1971 | Lovering | 240/1 LP X |
| 3,661,458 | 5/1972 | Noemer et al. | 355/36 X |
| 3,756,712 | 9/1973 | Weisglass et al. | 355/71 |
| 3,880,519 | 4/1975 | Barbieri | 355/36 |

Primary Examiner—Richard A. Wintercorn

[57] ABSTRACT

The device for correcting the color of a color film printing machine, equipped with three different optical filters which divide the diaphragm hole of an optical system condenser on three segments and two leaves, which partially stop down the filters; at the same time the leaves are suitably equipped with curved guides and pivot around points. Every pair of leaves is driven by a common lever equipped with a slide, which at the lever pivotal point, moves along guides. The linear increases of the lever turning angle is accompanied with a logarithmic increase of the filter-active field, for example, with a suitable radius of curvature, the guides, the length of lever, coordinates of the leaves', pivot points of lever, coordinates of pivot points of leaves, of the distance between the edge and the point of the leaves' pivot point, and coordinates which define the position of the guide curvature center in relation to the leaf edges.

11 Claims, 3 Drawing Figures

DEVICE TO CORRECT COLOR

BACKGROUND OF THE INVENTION

The object of the present invention is a device for correcting the colour of the colour film printing machines.

There are already known in the part printing machines, the optical system of which is equipped with three different filters, which divide a condenser diaphragm hole onto three segments, and the size of every filter-active field determines how to achieve three so-called basic colours in the printing machine. In previously known devices for correcting the colour there are applied bands with proper holes. which delimit every filter-active field. A disadvantage of these devices is it is very time consuming to manufacture these bands, which must be different for every negative and must contain a proper composition of three holes for every embrace of the negative. They are also known devices in which the composition of basic colours is controlled by means of easily perforated bands, carrying necessary informations in the form of small holes arranged according to a fixed code. A suitable electromechanical system sets in motion three diaphragm leaves which delimit the active section of the three different colloured bundles of light. A disadvantage of these devices is a highly developed optical system, which at first diffracts the light on three different colour bundles, and then joins and projects them onto the printed film in a suitable light combination. Another disadvantage of known devices consists in the electromechanical system working relatively slowly, because the different bundle stop-downs are achieved by discrete small steps. Another disadvantage is the currently used system of linear increases of the mechanism step change onto logarithmic increases of the active section of the bundles, consisting of cams that are difficult to implement. A further shortcoming of the currently used devices is the unsatisfactory qualtiy of the light mixture which on the film can be recovered a structure of the light source, for example the bulb filament enabling a recovery of a structure of the light source—e.g. the bulb filament on the film. It is, therefore, an object of the present invention to create a device for correcting the colour of printing machines which would be controlled by a perforated band, but which does not require a diffraction of the light of three bundles; which, moreover, locates the diaphragm leaves in one step, which changes linear increases to logarithmic increases by means of guides having a constant radius of curvature; and the optical system of which mixes the light source perfectly. This aim is achieved by a device in which each of the three filters, dividing condenser diaphragm hole on three segments, is stopped down with two leaves, equipped with curved guides and pivoting upon fixed points, and every pair of such leaves is driven with a common level equipped with a slide, which, during the lever turn, moves in guides of such radius of curvature, that the linear angular increase of the lever turn is accompanied by a logarithmic increase of the filter active field. The lever is driven by a multiposition electromagnetic relay, composed of magnets, the cores and armatures of which are attached to a number of two-armed rockers on a common axis at the same time the sum of the distances between armatures and cores of a distinct pair of electromagnets is determined by an angle at which two adjoining rockers at the instant when one electro magnet of one pair is disconnected, and the second one is connected to the current source. In any successive pair of electromagnets the sum of distances between armatures and cores is half as large as the sum of an analogous previous pair. The last relay rocker is joined with the lever driven leaves, while the first rocker is joined with a screw or worm mechanism, which allows for manual introduction of additional angle setups. The device's optical system contains a glass bar functioning as a light conductor, and on the front surface of the bar is a refracted picture of the light source, while the rear surface of the bar is reproduced on the film surface by a condenser optical system. According to the present invention, the location of the leaves—which delimit three filter-active field—in one condenser diaphragm, avoids the printing machine light from deffracting on three bundles. Owing to the suitable choice and location on the diaphragm leaves of the guide radius curvature, only circular cams are required. The use of multiposition electromagnetic relays according to the invention reduces considerably the time of diaphragm leaves transposition, because all relay rockers can be switched over at the same time. A proper choice of the distances between armature and cores of electromagnets makes possible the relay control directly from the perforated band, coded according to the binary system of numbers.

BRIEF DESCRIPTIONS OF THE DRAWINGS

The invention will be explained in greater detail.

FIG. 1 shows a condenser diaphragm with three filters, of which only one is stopped down with two leaves;

FIG. 2 — a perspective view of multiposition electromagnetic relays with levers which serves to drive leaves;

FIG. 3 — a cross-section of the device's optical system in accordance with the present invention.

DESCRIPTION OF THE PREFERRED EMBODIMENTS

The device's optical system in accordance with the present invention, contains a light source X, the picture Y of which is reproduced by means of a mirror G on the bar front surface E, and the bar E rear surface Z is projected by a condenser system U on the surface of the film B. Between condenser U lens is a diaphragm P, the hole of which is divided on three sectors by filters $F_1$, $F_2$, $F_3$. Every filter is stopped down with two leaves, (on the illustration there appear only leaves $L_1$ and $L_2$ stopping down the filter $F_1$). Every leaf is equipped with a curved guide $K_1$ or $K_2$, along which moves a slide W during the lever D turn round the fulcrum $0_3$; in connection with the leaf $L_1$ which rotates around the point $0_1$ and the leaf $L_2$ around the point $0_2$. Lever D actuates a multiposition magnetic relay comprising several electromagnets M, the cores R and armatures Z which are in pairs and attached to a number of rockers H which pivot round a common axis O.

The first rocker can be displaced freely by means of a screw or worm mechanism S. Each of the rockers must be displaced in relation to the prior one, subjected to the current flow through the left or right electromagnet of the pair, and the last rocker sets up the lever D in a position which corresponds to the angle of the first positioned rocker and to the sum of all reciprocal angle positions of every indirect rocker. If the sum of distances $d_1$ and $d_2$ between armatures Z and cores R of any pair of electromagnets M is always half as large as analogous sum of the prior pair, the relay can be placed in many equally remote from one another's angle positions, the quality J of which depends on the quality of electromagnet T pair, according to the formula $$J = 2^r$$

The position of the entire relay can shift from any position to any other chosen position with one stroke, because the perforated band permits a switch-over at the same time of all electromagnets, and linear increases of the angle of rotaion lever of D cause such angles of rotation leaves $L_1$ and $L_2$ which produces a logarithmic increase of the filter-active field, for example, of filter $F_1$, under condition of a proper selection of the guide $K_1$ and $K_2$ radius of curvature $r_1$ and $r_2$ of the lever D length, of coordinates $s$ and $t$ of the lever pivot point $0_3$ of coordinates $a$ and $c$ of the leaves pivot points $0_1$ and $0_2$, of the distance $b$ between the edge and the pivot point of leaves and coordinates $m_1$ and $\phi_1$ or $m_2$ and $\phi_2$, which define the position of the guide curvature center in relation to leaf edges.

Figure 1:
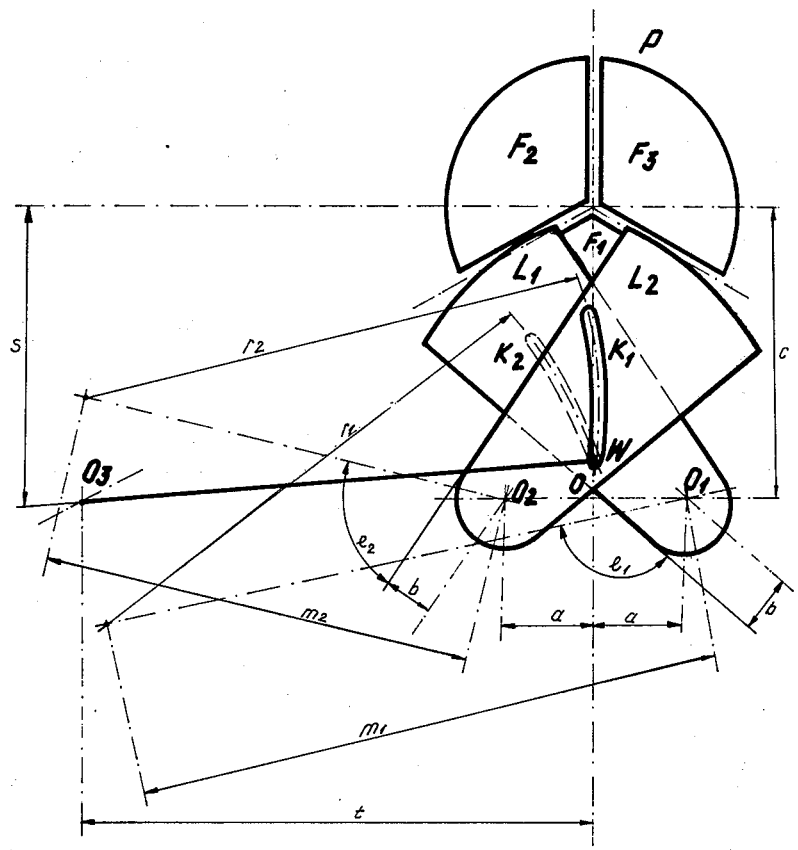
Figure 2:
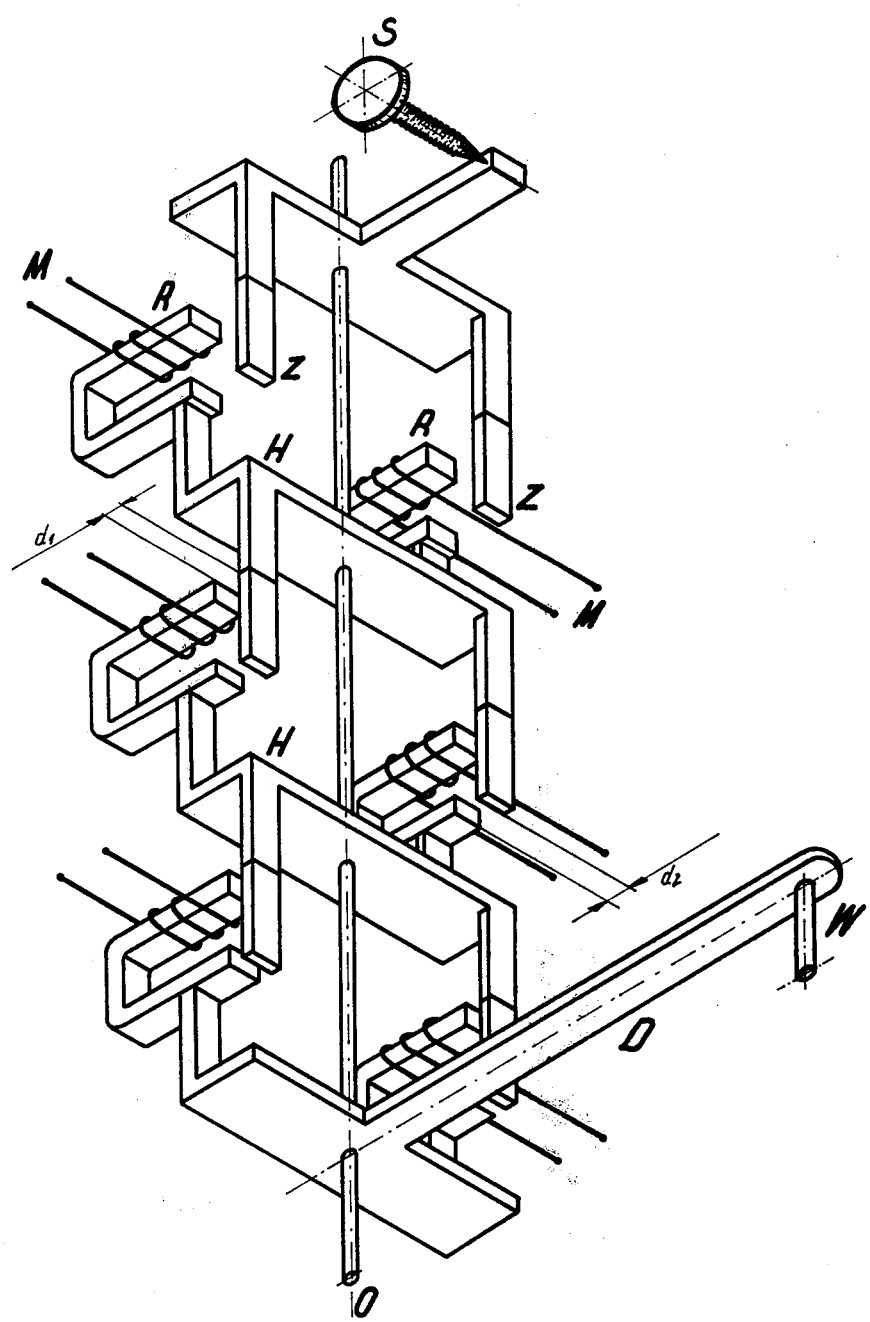
Figure 3:
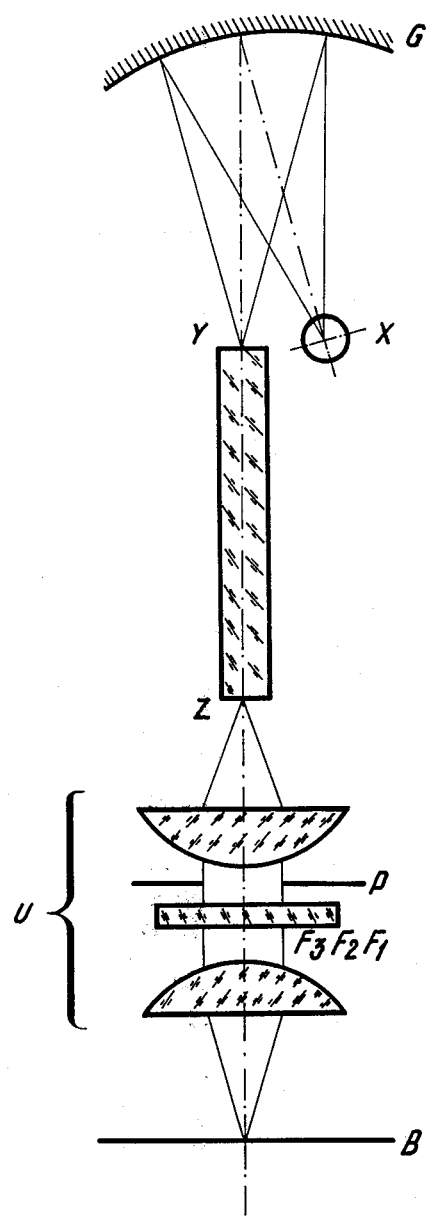

For purposes of clarifying the operation of the arrangement of FIG. 2, assume that the uppermost armature is rotatably displaced by means of the screw S, so that this aramature is displaced from the core of the top left-hand electromagnet. When this electromagnet becomes energized, it becomes attracted to the displaced armature, and thereby moves toward the armature which has been set in position by means of the screw S. The movement of this top electromagnet, then causes also displacement of the armature associated with the electromagnet that is located directly below. This second electromagnet is at the center of the three electromagnets shown in FIG. 2. If this center electromagnet, at the left-hand of FIG. 2, is now energized, it becomes attracted to its corresponding armature, and as a result this center electromagnet must travel the displacement of the top electromagnet as well as the gap distance that was present between the core of the center electromagnet and its corresponding armature. The movement of the center electromagnet about the axis 0, then causes also rotation of the armature associated with the lowest one of the three electromagnets, since that armature of the lowest electromagnet is connected to the core of the center electromagnet. Accordingly, when the lowest electomagnet becomes energized, it becomes attracted to its corresponding armature and travels thereby through a rotational angle which is the sum of the previous rotational angles. The rotational travel of the lowest electromagnet is transferred to the lever d which is connected to the core of the lowest electromagnet. In operation, therefore, all three electromagnets may be energized simultaneously to result in a predetermined rotation of the lever D. In this arrangement, the shaft along the axis 0 does not rotate. It serves merely as a rotational support for the armatures and the electromagnets connected thereto.

I claim:

1. A device to correct color, comprising a white light source, means for mixing a white light beam, a condenser and means for focusing the beam on a film stock, a system of three optical filters situated motionless inside said condenser and focusing means, a system of movable leaves stopping down a part of an active field of the filters, and means for changing position of the leaves.

2. The device according to claim 1, wherein said means for mixing a white light beam has a light conductor in the shape of glass bar with a smooth cylindrical surface, two diffusing frontal surfaces, and a concave mirror reflecting a picture of the light source on one of the bar frontal surfaces.

3. The device according to claim 2 wherein said condenser and focusing means is situated so that reproduction of the picture of the second frontal surface in the direction of light through the bar takes place on the film, said film having a frame, said picture being substantially larger than the frame of the film.

4. The device according to claim 1 wherein said condenser and focusing means has an aperture diaphragm with round hole, said system of three optical filters being situated motionless inside the round hole of the aperture diaphram, each of the three filters occupying another part of the hole and serving to color the part of the light beam which passes through the active field of the respective filter.

5. The device according to claim 1 wherein said means for changing the position of the leaves comprises three indentical mechanisms, every mechanism having a turning lever as well as a multiposition electromagnetic delay for turning said lever.

6. The device according to claim 5, including a slider moving in curved guides of two leaves forming one pair of leaves during turning of said lever, said lever being ended with said slider, the turning of the lever causing turning of the leaves so that linear increases of the lever turning angle are accompanied by logarithmic increases of the section of the part of the light beam which is limited by the respective pair of leafs.

7. The device according to the claim 5 wherein said multiposition electromagnetic relay has a plurality of two-armed rockers turning about a common axis which is also an axis of rotation of the lever, the last rocker being fastened to said lever, the first rocker being coupled with a threaded mechanism for displacing manually the angle of inclination of the first rocker.

8. The device according to the claim 7 wherein cores of electromagnets are attached to opposite arms of said rockers, two electromagnets being always present between two adjacent rockers, said electromagnets being switched on alternately so that the adjacent rockers turn by a predetermined relative angle at an instant when one electromagnet is disconnected and the second one is connected to a current source.

9. The device according to the claim 8 wherein the distances between cores of said electromagnets are so matched that the respective relative angles by which adjacent rockers turn are different.

10. The device according to the claim 9 wherein succeeding relative angles are so matched, that every following angle is twice larger than the previous relative angle.

11. A device to correct color, comprising a white light source, means for mixing a white light beam, a condenser and means for focusing the beam on a film stock, a system of three optical filters situated motionless inside said condenser and focusing means, a system of movable leaves stopping down a part of an active field of the filters, means for changing position of the leaves, said means for mixing a white light beam having a light conductor in the shape of glass bar with a smooth cylindrical surface, two diffusing frontal surfaces, and a concave mirror reflecting a picture of the light source on one of the bar frontal surfaces, said condenser and focusing means being situated so that reproduction of the picture of the second frontal surface in the direction of light through the bar takes place on the film, said film having a frame, said picture being substantially larger than the frame of the film, said condenser and focusing means having an aperture diaphragm with round hole, said system of three optical filters being situated motionless inside the round hold of the aperture diaphram, each of the three filters occupying another part of the hole and serving to color the part of the light beam which passes through the active field of the respective filter, the movable leaf system containing three pairs of leaves, every pair of leaves stopping down a part of the active field of one determined filter and limiting a section of the part of the light beam which passes through the respective filter.

* * * * *